United States Patent
Pimpinella et al.

(10) Patent No.: US 11,852,871 B2
(45) Date of Patent: Dec. 26, 2023

(54) SHORT REACH GAP CONNECTOR

(71) Applicant: Panduit Corp., Tinley Park, IL (US)

(72) Inventors: Richard J. Pimpinella, Prairieville, LA (US); Jose M. Castro, Naperville, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 17/736,278

(22) Filed: May 4, 2022

(65) Prior Publication Data

US 2023/0358967 A1 Nov. 9, 2023

(51) Int. Cl.
*G02B 6/38* (2006.01)

(52) U.S. Cl.
CPC ......... *G02B 6/3821* (2013.01); *G02B 6/3831* (2013.01); *G02B 6/3863* (2013.01); *G02B 6/3877* (2013.01)

(58) Field of Classification Search
None
See application file for complete search history.

(56) References Cited

U.S. PATENT DOCUMENTS

| | | | | |
|---|---|---|---|---|
| 4,148,554 A | * | 4/1979 | Magnusson | G02B 6/32 385/88 |
| 4,850,664 A | * | 7/1989 | Iri | B24B 19/226 385/85 |
| 5,071,218 A | | 12/1991 | Nishmoto | |
| 5,082,378 A | * | 1/1992 | Muller | G02B 6/3831 385/72 |
| 5,796,894 A | * | 8/1998 | Csipkes | G02B 6/3821 385/38 |
| 5,946,436 A | * | 8/1999 | Takashi | G02B 6/3869 385/60 |
| 6,341,191 B1 | * | 1/2002 | Takahashi | G02B 6/266 385/23 |
| 9,921,375 B2 | | 3/2018 | Compton et al. | |
| 9,989,709 B2 | | 6/2018 | Koshinz et al. | |
| 10,983,288 B2 | | 4/2021 | Jian | |
| 2002/0061172 A1 | * | 5/2002 | Kuroha | G02B 6/3834 385/78 |
| 2003/0068121 A1 | * | 4/2003 | Matsuura | G02B 6/2938 385/47 |

(Continued)

FOREIGN PATENT DOCUMENTS

CN 108205177 A 6/2018

OTHER PUBLICATIONS

Arao Hajime et al: "Small Footprint Air-gap Multi Fiber Connector with Low Loss and Low Mating Force", 2018 Optical Fiber Communications Conference and Exposition (OFC), OSA, Mar. 11, 2018 (Mar. 11, 2018), pp. 1-3, XP033357529, [retrieved on Jun. 13, 2018].

*Primary Examiner* — Jerry Rahll
(74) *Attorney, Agent, or Firm* — Christopher S. Clancy; James H. Williams; Christopher K. Marlow

(57) ABSTRACT

An optical fiber connector ferrule assembly has a ferrule holder and a ferrule partially within the ferrule holder. The ferrule holder has a keying feature for setting the angular orientation of the ferrule assembly within a connector housing. The ferrule includes at least one stand-off feature on the end face of the ferrule for maintaining a controlled air gap spacing when mated to a second compatible ferrule assembly.

3 Claims, 4 Drawing Sheets

(56) References Cited

U.S. PATENT DOCUMENTS

| | | | |
|---|---|---|---|
| 2003/0215171 A1* | 11/2003 | Lampert | G02B 6/3812 |
| | | | 385/11 |
| 2003/0235374 A1* | 12/2003 | Luther | G02B 6/3885 |
| | | | 385/71 |
| 2006/0013537 A1* | 1/2006 | Miyake | G02B 6/3874 |
| | | | 385/60 |
| 2013/0163930 A1* | 6/2013 | Jian | G02B 6/443 |
| | | | 385/60 |
| 2014/0105543 A1* | 4/2014 | de Jong | G02B 6/3885 |
| | | | 29/428 |
| 2015/0316727 A1* | 11/2015 | Kondo | G02B 6/3855 |
| | | | 385/84 |
| 2017/0023747 A1 | 1/2017 | Zbinden | |
| 2017/0248761 A1 | 8/2017 | Jian | |
| 2020/0049901 A1* | 2/2020 | Jian | G02B 6/3863 |

* cited by examiner

SHORT REACH GAP CONNECTOR

FIELD OF INVENTION

The present invention relates generally to the field of optical fiber connectors and more specifically to an optical connector ferrule assembly for low-cost short-reach optical communications applications. The disclosed connector assembly utilizes many of the same components of standard ferrule connectors, however, it eliminates the physical contact attribute of the optical fiber interconnection and introduces a small air gap at the fiber interface. The present invention eliminates the need for the ferrule end face polishing process, thereby increasing the production throughput and reduces the manufacturing cost.

BACKGROUND

Historically, the development of optical connectors has been for long distance optical communications where the distance (i.e., reach) between optical transceivers or transponders can be tens of kilometers and with repeaters, as far as hundreds and even thousands of kilometers as deployed in trans-Atlantic applications. As a result, the primary objective in the design and manufacture of optical connectors has been to reduce the optical insertion loss (IL) between mated optical fibers. For fiber optic communications, the most common connector types utilize high precision cylindrical ferrules 100 for terminating the fiber 101 and for mating with a second similarly terminated fiber, see FIG. 1. The two mated connectorized fibers are mated by means of an optical adapter comprising an alignment split sleeve 200. To terminate an optical fiber, the fiber 101 is inserted into a concentric bore 102 having a diameter precisely sized to hold, with minimal clearance, the optical fiber which has a Standards specified diameter of 125 microns. To achieve low loss, the bore must be concentric on the optic axis 211 defined by the surrounding outer diameter of said ferrule 100, see FIG. 2. Once the fiber is fixed in place (typically with epoxy), the ferrule end face 204 must be highly polished to produce a dome shape ferrule surface where, the fiber end face has an optically smooth and flat surface. To ensure physical contact and eliminate any air gap that might produce Fresnel reflections, the fiber end faces must be in physical contact. The polishing process must produce a convex dome 106, on the end face of the ferrule, where the apex is precisely concentric with the optic axis of the fiber and ferrule, and the optical fiber must have a precisely controlled protrusion (spherical high) relative to the polished ferrule surface apex, see FIG. 3.

To ensure physical contact of the fiber end faces when mated, the ferrules are spring loaded 312 and 322 within the connector assembly and designed to press the mating optical fibers with sufficient force, see FIG. 4. As a result, the precision of the ferrule, the fiber and ferrule diameters, concentricity, end face geometry, and required fiber protrusion, increases the cost of the optical connector and the manufacturer time. Therefore, it is desirable to eliminate the polishing procedure, the need for physical contact, and any unnecessary components, such as the springs.

Today, optical fiber connectivity is widely used for Data Center network applications for channel reaches typically ranging from 1 m to less than 300 m. The most economical fiber technology for these short reach applications is multimode fiber (MMF), where the core diameter of said MMF is 50 microns (125 um outside diameter) as opposed to single-mode fiber (SMF) with a core diameter of about 9 microns and used for long distance communications. The reach of MMF is limited by modal dispersion of the optical modes as they propagate through the fiber. For data rates higher than 10 Gb/s, the supported channel reaches of MMF have been reduced from 550 m over Standards specified MMF for data rates equal to or less than 1 Gb/s, to less than 50 m for data rates of 50 Gb/s and higher utilizing PAM-4 modulation schemes, FIG. 5. As can be observed in FIG. 5, as the channel reaches for high speed optical communications over MMF increased, the optical fiber attenuation, i.e., fiber IL of the channel decrease, where the fiber IL is only 0.18 dB. Hence, high-speed channels are no longer attenuation limited, but instead are dispersion limited by both modal and chromatic dispersion penalties. Therefore, the insertion loss of a mating interface between two MMFs can be increased without effecting the performance of the optical channel. The maximum connector IL is specified by the specific application.

One examplinary application for a gap connector in accordance with the present invention is the next generation automotive network for autonomous vehicles. At the time of this writing, the IEEE P802.3cz Task Force is developing a new multi-gigabit Ethernet Standards for automotive applications, where the specified connector insertion loss can be as high as 2.5 dB, compared to <0.75 dB for typical physical contact Ethernet optical connectors. In addition to IL, when two mating optical fiber end faces are separated by a small air gap, Fresnel reflections occur at the two fiber end faces which can cause multiple reflections within the gap, where coherent light can interfere with itself at the two air-glass interfaces resulting in destruction interference, thereby significantly increasing the IL at the interface. This is the case in single-mode optical communications. However, for multimode optical signals, the coherence length of the optical signal is only about 6 cm beyond the cavity of multimode Vertical Cavity Surface Emitting Laser (VCSEL) and therefore, any light undergoing multiple reflections due to the gap region between two closely separated fiber end faces is not impaired by Multi-Path Interference (MPI).

In this disclosure we describe a "Gap" connector where the mating optical end faces of two optical fibers are separated by at least 1 micron, but not more than 100 microns, which can be used for very short reach applications, where the optical power budgets are dispersion limited and not attenuation limited.

SUMMARY

An optical fiber connector ferrule assembly has a ferrule holder and a ferrule partially within the ferrule holder. The ferrule holder has a keying feature for setting the angular orientation of the ferrule assembly within a connector housing. The ferrule includes at least one stand-off feature on the end face of the ferrule for maintaining a controlled air gap spacing when mated to a second compatible ferrule assembly.

DESCRIPTION OF THE INVENTION

Figure 1:
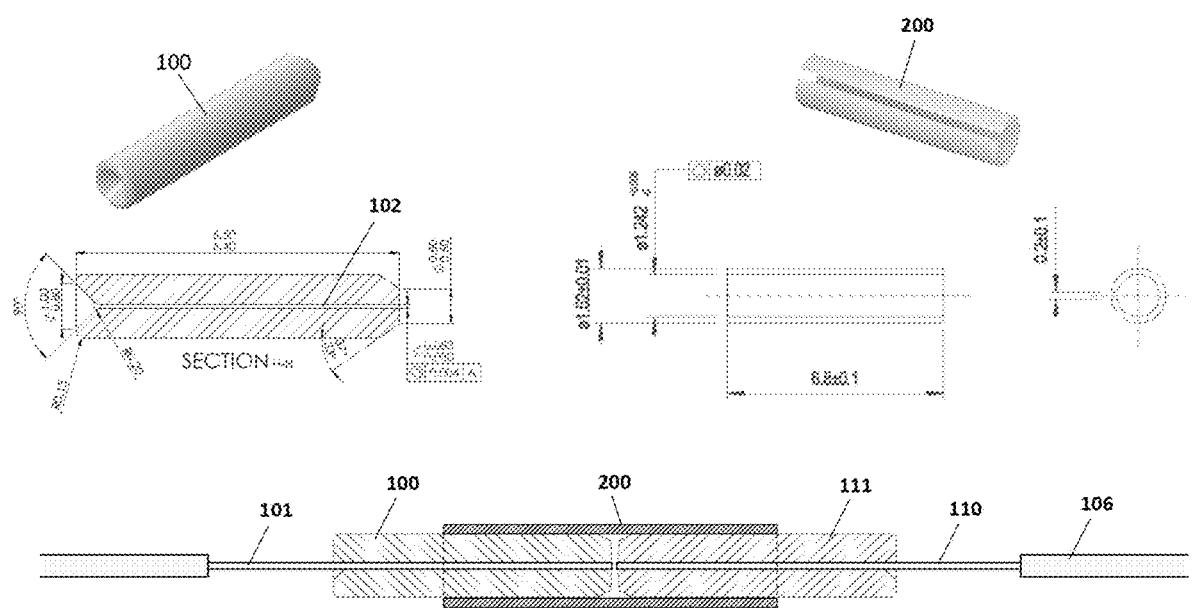
FIG. 1 shows the mating of prior art optical ferrules 100 and 111, where the said ferrules are held in alignment by means of split sleeve 200.
Figure 2:
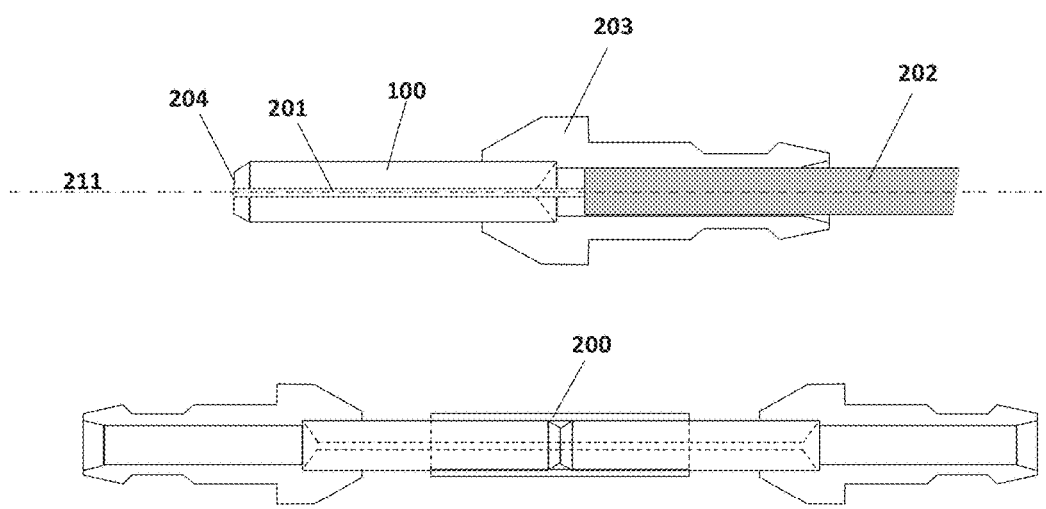
FIG. 2 shows a cross-sectional view of a ferrule subassembly using the ferrule of FIG. 1. Where, ferrule 100 is assembled into a ferrule holder 203, and optical fiber 101 is inserted into the concentric bore of ferrule 100.
Figure 3:
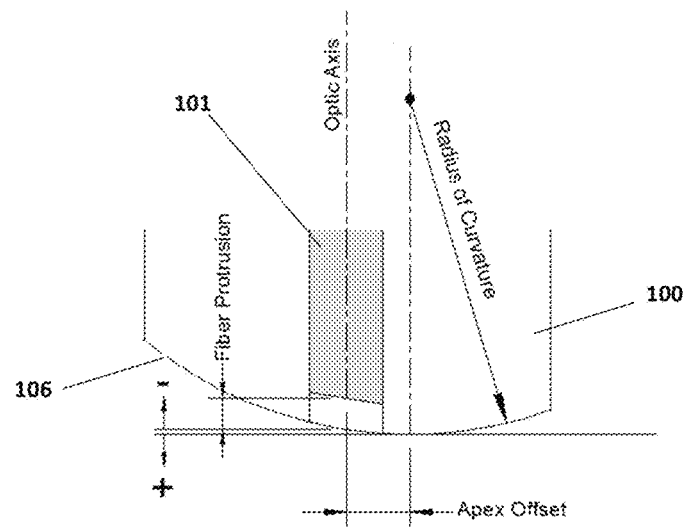
FIG. 3 shows the critical polishing parameters of the end face of standard physical contact ferrule subassembly. Polished end face 106 of a prior art optical ferrule, must have a specified radius of curvature, fiber protrusion, and apex offset.
Figure 4:
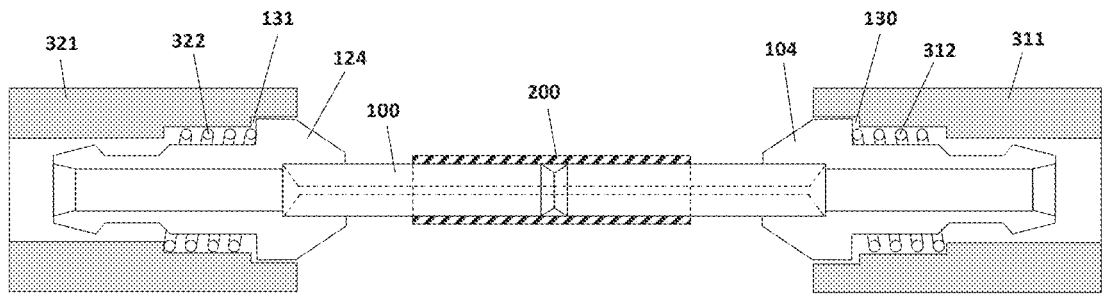
FIG. 4 shows the mated ferrule assemblies of FIG. 3 being biased towards each other by a pair of springs.
Figure 5:
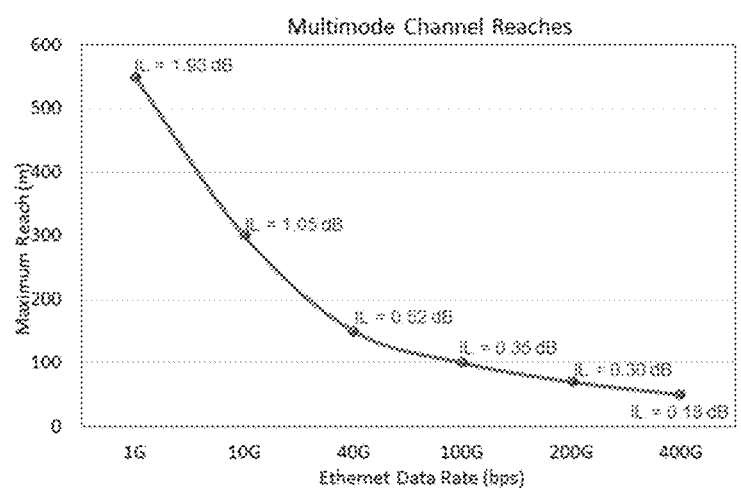
FIG. 5 shows how the channel reach decreases as the data rate of the optical communication increase for a MMF optical channel link. Although the optical fiber attenuation, i.e., fiber IL, of the channel decrease, the channel becomes bandwidth limited due to modal and chromatic dispersions.
Figure 6:
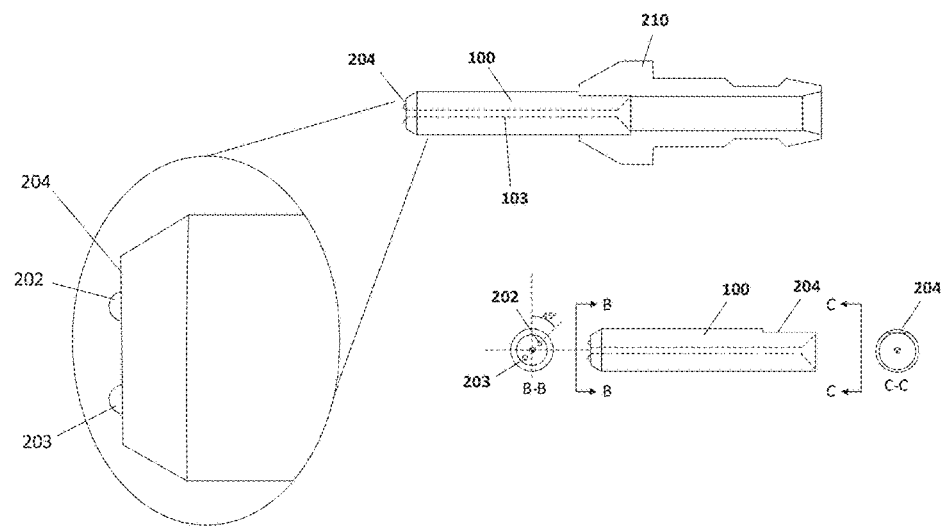
FIG. 6 shows a side view of a first embodiment of a ferrule assembly according to the present invention.

In general, there are many fiber optic connector types defined by TIA and other industry Standards bodies for terminating OM3, OM4, OM5 and other graded-index multimode optical fiber assemblies. Therefore, here we will limit our description to the modification to a generic optical connector ferrule assembly according to the present invention. In FIG. 6, we illustrate the basic concept, where we show a ferrule 100 mounted in a ferrule holder 210.

In place of the standard cut and polish process, the end of said optical fiber protruding from the ferrule bore is laser cleaved producing a heat polished end face. The choice of stand-off design is largely determined by the laser cleaving process. Sufficient space must be maintained to allow the laser beam to cleave the fiber unobstructed and close to the ferrule end face. In this example we illustrate round bumps 202 and 203 as stand-offs.

Figure 7:
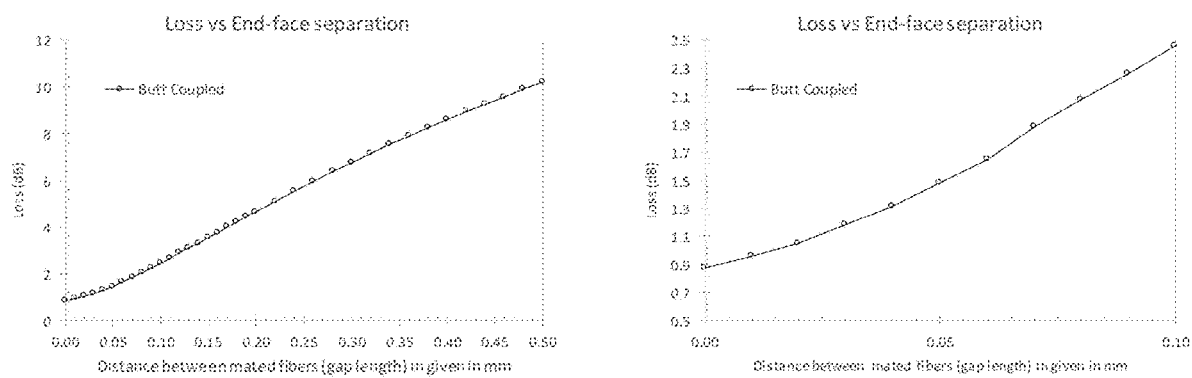
FIG. 7 shows a plot of the measured IL as a function of fiber separation between two 50 micron core multimode fibers.

Low cost connector ferrules for MMF can be made of a molded polymer material instead of a higher cost ceramic material, the tradeoff is precision. However, the benefit of multimode optical fibers compared to single-mode, is higher acceptable tolerances. The concept herein, is to mold one or more stand-offs on the end of said ferrule, in this example, the two bumps 202 and 203, to form spacers when mated to a seconded modified connector ferrule, thus creating a controlled gap between mating fibers. Depending on the maximum insertion loss for a given application, the gap between fibers can be adjusted by the height of the bumps. For reference, in FIG. 7, we plot the measured IL as a function of fiber separation between two 50 micron core multimode fibers. The cost and time savings are achieved by the short cleave step provided by laser cleaving process, which also heat polishes the end of protruding optical fiber close the ferrule end face.

Figure 8:
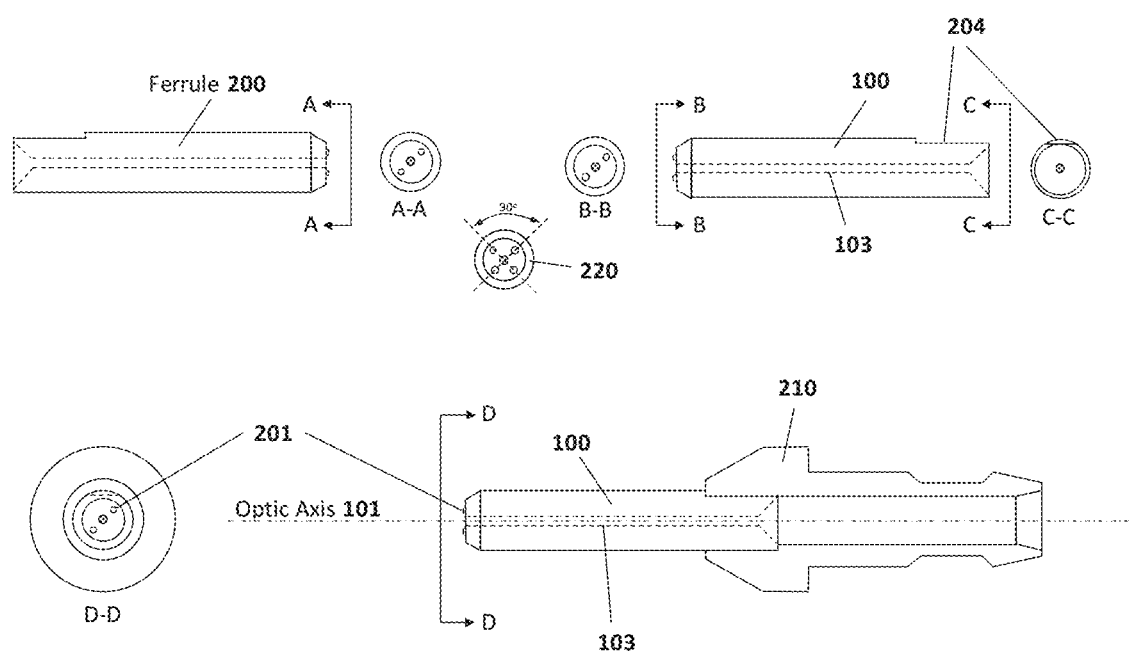
FIG. 8 shows a ferrule similar to the one of FIG. 6 wherein the stand-offs are rotated 45° clockwise.

To prevent interference between the stand-offs of each of two mating connectors, the angular orientation of the ferrule within the ferrule holder must be maintained. Here we use a flat 204 molded in the ferrule, FIG. 6. The bumps 202 and 203 are molded at an angle relative to the normal of a molded flat 204 in said ferrule to define an orientation. In this example, the bumps are rotated 45 degrees clockwise as shown in FIG. 6. When the two said ferrules are mated, the spacer bumps are positioned 90 degrees to each other 220 as illustrated in FIG. 8.

The size of the gap is determined by the size of the bumps, which can be selected based on the maximum increase in insertion loss for the giving application.

In another embodiment, a low cost connector ferrules for MMF can be made of a molded polymer material with end face angle around 8 degrees, with one or more stand-offs on the end of said ferrule. This connector reduces the optical return loss (RL) of the channels and therefore minimize potential noise penalties.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An optical fiber connector ferrule assembly comprising:
    a ferrule holder; and
    a ferrule partially within the ferrule holder and having a keying feature for setting the angular orientation said ferrule assembly within a connector housing, and further wherein the ferrule includes at least one stand-off feature on the end face of the ferrule for maintaining a controlled air gap spacing when mated to a second compatible ferrule assembly and the fibers are laser cleaved and no polishing process is required.

2. A ferrule assembly according to claim 1, where the stand-off features provide a mating gap spacing of at least 1 micron, and less than 100 microns.

3. A ferrule assembly according to claim 1, where the dimensional tolerance of bumps and offsets allow for connector losses below 2 dB per connections.

* * * * *